(No Model.)
M. B. GOOING.
CULTIVATOR.
No. 510,969.  Patented Dec. 19, 1893.
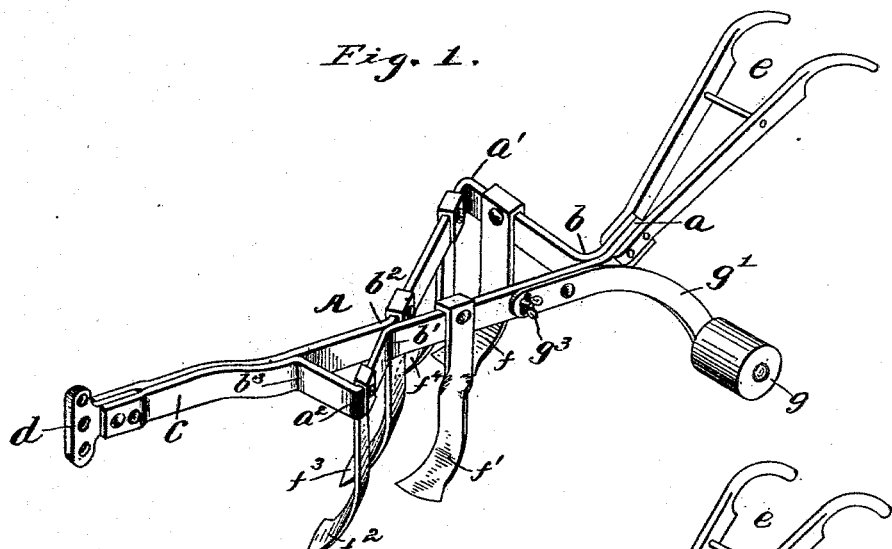
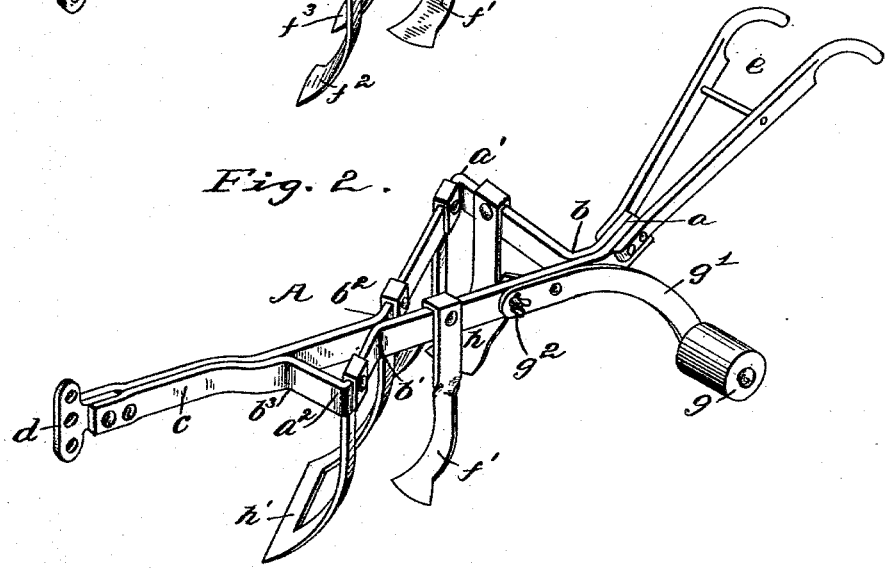
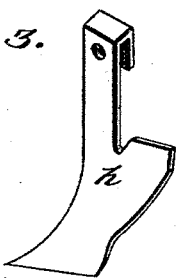
WITNESSES,
Martin B. Gooing.
INVENTOR.

UNITED STATES PATENT OFFICE.

MARTIN BIRD GOOING, OF SELMA, ALABAMA.

CULTIVATOR.

SPECIFICATION forming part of Letters Patent No. 510,969, dated December 19, 1893.

Application filed June 30, 1893. Serial No. 479,299. (No model.)

*To all whom it may concern:*

Be it known that I, MARTIN BIRD GOOING, a citizen of the United States, residing at Selma, in the county of Dallas and State of Alabama, have invented certain new and useful Improvements in Cultivators; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention is a new "cultivator;" and consists in the novel construction and arrangement of its parts, hereinafter set out in this specification and the claims thereto annexed.

In the accompanying drawings: Figure 1 is a perspective view of my invention. Fig. 2 is a perspective view of my invention when I use the scraper and shovel-plow. Fig. 3 is a detail view of the shovel-plow.

My invention is described as follows: The frame A, consists of an iron beam bent back upon itself at $a$, at right angles at the points $a'$, and $a^2$, and obtuse angles at the points $b$, $b'$, $b^2$, and $b^3$, terminating in a tongue $c$. Said frame therefore consists of right and left angles held together by proper rivets and bolts in suitable shape to carry handles $e$, plow points $f$, $f'$, $f^2$, $f^3$, and $f^4$; said points to be secured at the perforated places in the frame by means of bolts and nuts, or clamps which have already been allowed me October 7, 1892, Serial No. 444,923. The wheel $g$, is journaled on the arm $g'$; said wheel is for the purpose of regulating the depth of the cultivator, and the arm $g'$, is pivoted to the frame and has in its front end a slot $g^2$, through which a bolt works mounted with the thumb-screw $g^3$, thus making said arm adjustable; the plow points $f$, $f'$, $f^2$, $f^3$, and $f^4$, (or teeth) are right and left; those placed on the front part of the frame carry the rough top dirt and trash from the plant to the middle of the row performing the work of a side harrow, while the left hand points on the rear part of the frame carry the clean dirt to the plow. The left hand point $f$, is twisted to suit the straight bar on which it is situated and can be used no where else. Sometimes in place of the point $f$, I use a shovel plow $h$, and in place of the points $f^2$, and $f^3$, a scraper $h'$. (See Fig. 2.) My points have an edge bend giving them a mold board shape making the cultivator of a very light draft. I wish to call special attention to this feature which is also my invention.

Having described my invention, what I claim as new, and desire to secure by Letters Patent, is—

1. The combination of the frame A, consisting of a beam bent back upon itself at $a$, at right angles at the points $a'$, and $a^2$, obtuse angles at the points $b$, $b'$, $b^2$, and $b^3$, terminating in a tongue $c$; plow points $f$, $f'$, $f^2$, $f^3$, and $f^4$, secured to said frame; wheel $g$, journaled on adjustable arm $g'$, and handles for guiding the plow, substantially as shown and described and for the purposes set forth.

2. The combination of the frame A, consisting of a beam bent back upon itself at $a$, at right angles at the points $a'$, and $a^2$, obtuse angles at the points $b$, $b'$, $b^2$, and $b^3$, terminating in a tongue $c$; plow points $f$, $f'$, $f^2$, $f^3$, and $f^4$, having an edge bend in the shape of a mold board secured to said frame; wheel $g$, secured on the arm $g'$, and handles for guiding the cultivator, substantially as shown and described and for the purposes set forth.

In testimony whereof I affix my signature in presence of two witnesses.

MARTIN BIRD GOOING.

Witnesses:
H. H. STEWART, Jr.,
THEO. BERNARD.